(12) United States Patent
Lee

(10) Patent No.: US 9,731,707 B2
(45) Date of Patent: Aug. 15, 2017

(54) METHOD FOR IMPROVING DISTANCE TO EMPTY (DTE) OF HYBRID ELECTRIC VEHICLE

(71) Applicants: HYUNDAI MOTOR COMPANY, Seoul (KR); KIA MOTORS CORPORATION, Seoul (KR)

(72) Inventor: Kang Ho Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/956,537

(22) Filed: Dec. 2, 2015

(65) Prior Publication Data

US 2017/0080921 A1    Mar. 23, 2017

(30) Foreign Application Priority Data

Sep. 17, 2015   (KR) .......................... 10-2015-0131785

(51) Int. Cl.
| | |
|---|---|
| *B60W 20/00* | (2016.01) |
| *B60W 20/15* | (2016.01) |
| *B60W 20/13* | (2016.01) |
| *B60W 20/50* | (2016.01) |

(52) U.S. Cl.
CPC ............ *B60W 20/15* (2016.01); *B60W 20/13* (2016.01); *B60W 20/50* (2013.01); *B60W 2560/02* (2013.01)

(58) Field of Classification Search
CPC ...... B60W 20/13; B60W 20/14; B60W 20/15; B60W 20/20; B60W 20/40; B60W 20/50; B60W 2560/02
USPC ............................. 180/65.25, 65.26, 65.265
See application file for complete search history.

(56) References Cited

U.S. PATENT DOCUMENTS

| | | | |
|---|---|---|---|
| 9,440,553 B2* | 9/2016 | Kuhn ................... | B60W 50/14 |
| 2013/0166123 A1* | 6/2013 | Donald, III .............. | B60L 1/02 |
| | | | 701/22 |
| 2016/0001658 A1* | 1/2016 | Meyer ...................... | B60L 3/12 |
| | | | 701/22 |

FOREIGN PATENT DOCUMENTS

| | | |
|---|---|---|
| JP | 10-28302 A | 1/1998 |
| JP | 11-220803 A | 8/1999 |
| JP | 2009-012593 A | 1/2009 |
| JP | 2009-055675 A | 3/2009 |
| JP | 2014108641 A | 6/2014 |
| KR | 100867808 B1 | 11/2008 |

(Continued)

OTHER PUBLICATIONS

Korean Office Action corresponding to Korean Application No. KR10-2015-0131785 dated Oct. 4, 2016, 6 pages.

*Primary Examiner* — John Walters
(74) *Attorney, Agent, or Firm* — Brinks Gilson & Lione

(57) ABSTRACT

Disclosed herein is a method for improving a distance to empty (DTE) of a hybrid electric vehicle. The method includes: a hybrid control unit of the hybrid electric vehicle performing a warning against gasoline fuel exhaustion at a gasoline fuel exhaustion point in time depending on the DTE; deciding whether or not a mode of the hybrid electric vehicle is changed from an HEV mode into an EV mode depending on the warning against the gasoline fuel exhaustion; and driving the hybrid electric vehicle in the changed EV mode, and again changing the mode of the hybrid electric vehicle into the HEV mode when all of the electricity amount is exhausted at the time of driving the hybrid electric vehicle, thereby exhausting a remaining gasoline fuel.

5 Claims, 2 Drawing Sheets

(56) References Cited

FOREIGN PATENT DOCUMENTS

KR  10-2015-0014003 A  2/2015

* cited by examiner

METHOD FOR IMPROVING DISTANCE TO EMPTY (DTE) OF HYBRID ELECTRIC VEHICLE

CROSS-REFERENCE TO RELATED APPLICATION

Figure 1:
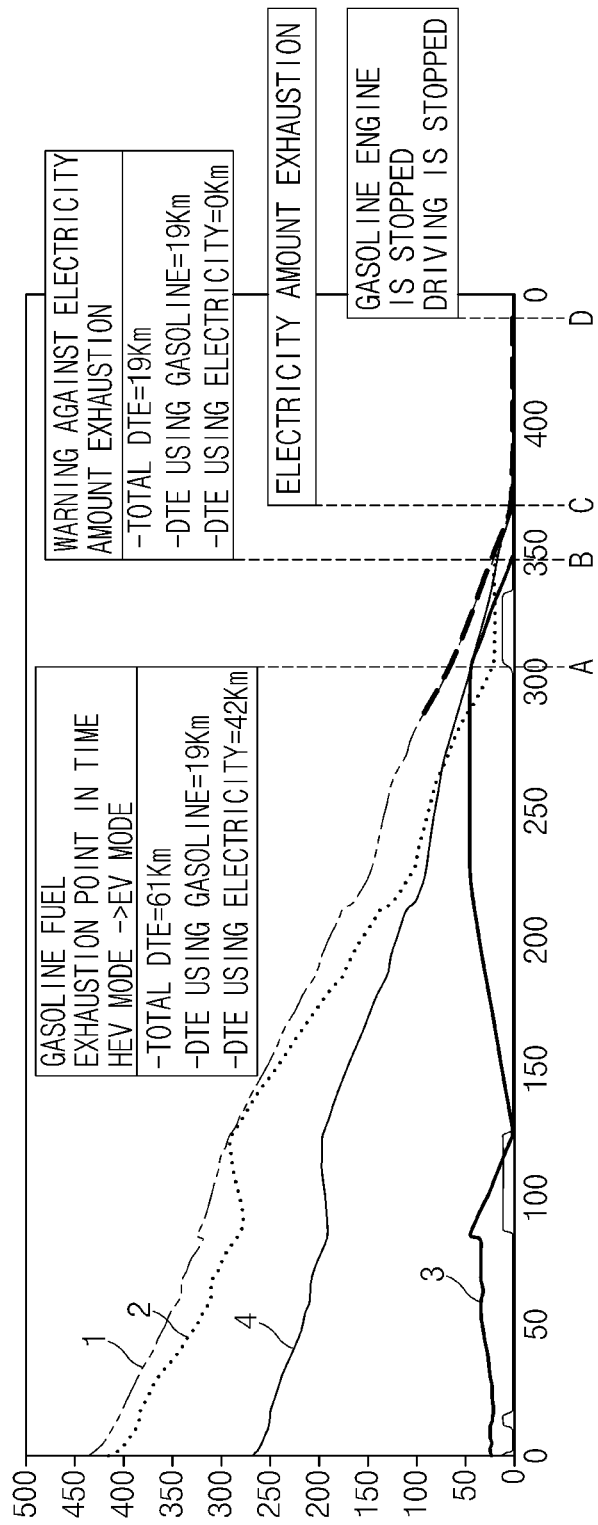

The present application claims the benefit of and priority to Korean Patent Application No. 10-2015-0131785, filed on Sep. 17, 2015, which is incorporated herein by reference in its entirety.

FIELD

The present disclosure relates to a method for improving a distance to empty (DTE) of a hybrid electric vehicle.

BACKGROUND

The statements in this section merely provide background information related to the present disclosure and may not constitute prior art.

An internal combustion engine used as a main power source of a vehicle is a discharge source of carbon dioxide and various pollutants, and has a significant influence on air pollution of residence and activity spaces of persons.

Therefore, regulation for emission gas of a land transport means such as the vehicle has been gradually strengthened. As a result, research into and development of a transport means that may use a power source other than a fossil fuel have been actively conducted.

One power source that may be a substitute for fossil fuel, which is a main factor of generation of carbon dioxide, is electrical energy, and a transport means driven by electricity does not generate pollution and generates a small amount of noise.

A battery used as a power source in the electric vehicle as described above should be repeatedly rapidly charged, movement of the transport means is limited at the time of charging the battery, and as the number of times of charging is increased, performance of the battery is rapidly deteriorated and a lifespan of the battery is rapidly shortened.

A device that may simultaneously solve disadvantages of a secondary battery as the power source for a transport as described above and a pollution problem of the internal combustion engine is a fuel cell. A fuel cell does not need to be charged like a secondary battery, may solve various problems due to direct combustion of the fossil fuel, does not substantially generate pollution, and may directly generate electricity.

However, in the case of the fuel cell, an output voltage is rapidly decreased in a high speed driving region in which a high voltage is required, such that the fuel cell does not supply sufficient electricity required for a driving motor. Therefore, there is a limitation in using the fuel cell as a power source of the electric vehicle.

SUMMARY

An aspect of the present disclosure provides a method for improving a distance to empty (DTE) of a hybrid electric vehicle capable of improving linearity and safety of the DTE by changing a mode of a hybrid electric vehicle from a hybrid electric vehicle (HEV) mode into an electric vehicle (EV) mode at a gasoline fuel exhaustion point in time of the hybrid electric vehicle.

According to one form of the present disclosure, a method for improving a DTE of a hybrid electric vehicle includes: a hybrid control unit of the hybrid electric vehicle performing a warning against gasoline fuel exhaustion at a gasoline fuel exhaustion point in time depending on the DTE; the hybrid control unit deciding whether a mode of the hybrid electric vehicle is changed from an HEV mode into an EV mode depending on the warning against the gasoline fuel exhaustion; and driving the hybrid electric vehicle in the changed EV mode, and again changing the mode of the hybrid electric vehicle into the HEV mode when all of the electricity amount is exhausted at the time of driving the hybrid electric vehicle, thereby exhausting a remaining gasoline fuel.

The method for improving a DTE of a hybrid electric vehicle may further include deciding that the gasoline fuel is sufficient when the hybrid control unit does not perform the warning against the gasoline fuel exhaustion at the gasoline fuel exhaustion point in time, thereby maintaining the hybrid electric vehicle in the HEV mode.

The method for improving a DTE of a hybrid electric vehicle may further include, between the driving of the hybrid electric vehicle in the changed EV mode and the exhausting of all of the electricity, performing a warning against electricity amount exhaustion at a point in time in which all of the electricity amount is exhausted.

In the deciding of whether or not the mode of the hybrid electric vehicle is changed from the HEV mode into the EV mode depending on the warning against the gasoline fuel exhaustion, the hybrid electric vehicle may be maintained in the HEV mode when an electricity amount for changing the mode of the hybrid electric vehicle into the EV mode is smaller than a preset electricity amount.

The DTE may be displayed on a cluster of the hybrid electric vehicle, and be measured through comparison with the gasoline fuel and the electricity amount.

Further areas of applicability will become apparent from the description provided herein. It should be understood that the description and specific examples are intended for purposes of illustration only and are not intended to limit the scope of the present disclosure.

DRAWINGS

Figure 2:
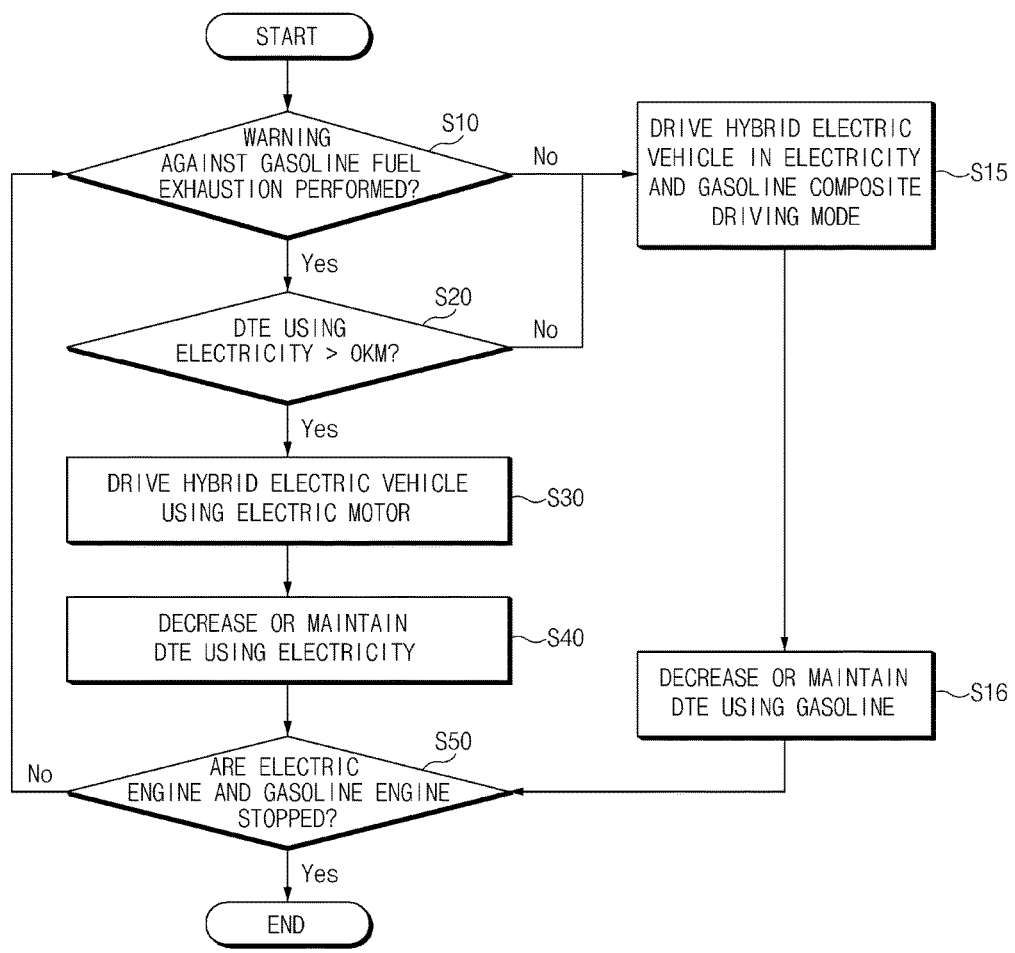

In order that the disclosure may be well understood, there will now be described various forms thereof, given by way of example, reference being made to the accompanying drawings, in which:

FIG. 1 is a graph for describing a method for improving a distance to empty (DTE) of a hybrid electric vehicle according to an exemplary form of the present disclosure; and FIG. 2 is a flow chart for describing the method for improving a DTE of a hybrid electric vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the accompanying drawings, exemplary forms of the present disclosure are not limited to illustrated specific forms, but are exaggerated for the purpose of clarity. Although specific terms have been used in the present specification, they are used in order to describe the present disclosure and are not used in order to limit the meaning or the scope of the present disclosure, which is disclosed in the appended claims.

In the present specification, a term 'and/or' is used as the meaning including at least one of components arranged before and after the term. In addition, terms 'connected/coupled' are used as the meaning including that any component is directly connected to another component or is indirectly connected to another component through the other component. Unless explicitly described to the contrary, a singular form includes a plural form in the present specification. In addition, components, steps, operations, and elements mentioned by terms 'include' or 'including' used in the present specification mean the existence or addition of one or more other components, steps, operations, and elements.

Hereinafter, an exemplary form of the present disclosure will be described in detail with reference to the accompanying drawings.

A distance to empty (DTE) of a hybrid electric vehicle according to an exemplary form of the present disclosure may be controlled and calculated in a hybrid control unit of the hybrid electric vehicle.

FIG. 1 is a graph for describing a method for improving a DTE of a hybrid electric vehicle according to an exemplary form of the present disclosure. In FIG. 1, an X axis indicates an actual driving distance, and a Y axis indicates a DTE.

Referring to FIG. 1, the hybrid control unit of the hybrid electric vehicle may change a mode of the hybrid electric vehicle from a hybrid electric vehicle (HEV) mode (gasoline and electricity composite driving mode) into an electric vehicle (EV) mode (electricity driving mode) depending on the DTE and perform a warning against gasoline fuel exhaustion at a gasoline fuel exhaustion point in time of the hybrid electric vehicle.

In detail, a total DTE 1 of the hybrid electric vehicle is continuously decreased at the time of driving the hybrid electric vehicle.

Here, the total DTE 1 of the hybrid electric vehicle is decreased, similar to a DTE 2 using gasoline, a DTE 3 using electricity, and a residual fuel amount 4. Here, the residual fuel amount 4 means a liter (L) unit of an actual fuel.

In detail, the total DTE 1 of the hybrid electric vehicle according to the present disclosure may be classified into of a gasoline fuel exhaustion point in time A, a maximum DTE point in time using electricity (electricity amount exhaustion warning point in time B), an electricity amount exhaustion point in time C, and a gasoline engine stop point in time (driving stop point in time D).

First, at the gasoline fuel exhaustion point in time A, the hybrid control unit changes a mode of the hybrid electric vehicle from the HEV mode into the EV mode.

For example, in the case in which the total DTE is 61 km, a DTE using the gasoline is 19 km, and a DTE using the electricity is 42 km, when the mode of the hybrid electric vehicle is changed into the EV mode, the DTE (19 km) using the remaining gasoline fuel may not be exhausted.

Next, the hybrid electric vehicle is driven in the changed EV mode and then receives a warning against electricity amount exhaustion at the electricity amount exhaustion warning point in time B.

Here, at the electricity amount exhaustion warning point in time B, the hybrid control unit of the hybrid electric vehicle warns the hybrid electric vehicle or a driver that an electricity amount is exhausted immediately before all the electricity amount is exhausted.

Next, the hybrid electric vehicle is driven by a predetermined distance after the electricity amount exhaustion warning point in time B and exhausts an electricity amount at the electricity amount exhaustion point in time C.

Next, after the electricity amount is exhausted, the hybrid control unit changes the mode of the hybrid electric vehicle from the EV mode into the HEV mode.

In addition, when all the remaining gasoline fuel is exhausted after the mode of the hybrid electric vehicle is changed into the HEV mode and the hybrid electric vehicle is continuously driven, a gasoline engine is stopped D.

The method for improving a DTE of a hybrid electric vehicle according to an exemplary form of the present disclosure is a technology capable of improving linearity of the total DTE and improving safety of an actual DTE by changing the mode of the hybrid electric vehicle from the HEV mode into the EV mode at the gasoline fuel exhaustion point in time A to exhaust all the electricity amount and then changing the mode of the hybrid electric vehicle from the EV mode into the HEV mode to exhaust all the remaining gasoline fuel.

FIG. 2 is a flow chart for describing the method for improving a DTE of a hybrid electric vehicle according to an exemplary form of the present disclosure.

Referring to FIG. 2, the hybrid control unit of the hybrid electric vehicle may change the mode of the hybrid electric vehicle from the HEV mode (gasoline and electricity composite driving mode) into the EV mode (electricity driving mode) depending on the DTE and performs the warning against the gasoline fuel exhaustion at the gasoline fuel exhaustion point in time of the hybrid electric vehicle (S10).

However, when the hybrid control unit does not perform the warning against the gasoline fuel exhaustion at the gasoline fuel exhaustion point in time of the hybrid electric vehicle, it is decided that the gasoline in the hybrid electric vehicle is still sufficient, such that the hybrid electric vehicle is maintained in the HEV mode (S15).

Then, since the mode of the hybrid electric vehicle is the HEV mode during a period in which the hybrid electric vehicle is driven, the DTE using the gasoline is gradually decreased and is then maintained (S16).

Next, the hybrid control unit decides that the gasoline fuel remaining in the hybrid electric vehicle is insufficient depending on the warning against the gasoline fuel exhaustion to decide whether or not the mode of the hybrid electric vehicle is changed from the HEV mode into the EV mode. That is, the hybrid control unit decides whether or not the DTE using the electricity is a set distance (0 km) or more (S20) before changing the mode of the hybrid electric vehicle into the EV mode.

Next, the hybrid control unit changes the mode of the hybrid electric vehicle from the HEV mode into the EV mode to drive the hybrid electric vehicle (S30).

Next, since the mode of the hybrid electric vehicle is the EV mode during a period in which the hybrid electric vehicle is driven, the DTE using the electricity is gradually decreased and is then maintained (S40).

Next, when the electricity amount of the hybrid electric vehicle is exhausted at the time of driving the hybrid electric vehicle in the EV mode and the mode of the hybrid electric vehicle is changed into the HEV mode to exhaust the remaining gasoline fuel, both of the electric engine and the gasoline engine are stopped (S50).

As described above, according to an exemplary form of the present disclosure, at the gasoline fuel exhaustion point in time, the warning against the gasoline fuel exhaustion is performed and the mode of the hybrid electric vehicle is changed from the HEV mode into the EV mode, thereby making it possible to improve linearity and safety of the DTE using the gasoline fuel and the electricity amount.

The method suggested in the present disclosure may be created as a computer program. In addition, codes and code segments configuring the computer program may be easily inferred by a computer programmer skilled in the art. Further, the created computer program is stored in a computer readable recording medium (information storing medium) and is read and executed by a computer to implement the method suggested in the present disclosure. In addition, the computer readable recording medium includes all types of recording media that may be read by the computer.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for improving a DTE of a hybrid electric vehicle, comprising:
    a hybrid control unit of the hybrid electric vehicle performing a warning against gasoline fuel exhaustion at a gasoline fuel exhaustion point in time depending on the DTE, the hybrid control unit deciding whether or not a mode of the hybrid electric vehicle is changed from a HEV mode into an EV mode depending on the warning against the gasoline fuel exhaustion; and
    driving the hybrid electric vehicle in the EV mode, and again changing the mode of the hybrid electric vehicle into the HEV mode when all of an electricity amount is exhausted at a time of driving the hybrid electric vehicle, thereby exhausting a remaining gasoline fuel.

2. The method for improving the DTE of the hybrid electric vehicle according to claim 1, further comprising deciding that the gasoline fuel is sufficient when the hybrid control unit does not perform the warning against the gasoline fuel exhaustion at the gasoline fuel exhaustion point in time, thereby maintaining the hybrid electric vehicle in the HEV mode.

3. The method for improving the DTE of the hybrid electric vehicle according to claim 1, further comprising, between the driving of the hybrid electric vehicle in the EV mode and the exhausting of all of an electricity amount, performing a warning against electricity amount exhaustion at a point in time in which all of an electricity amount is exhausted.

4. The method for improving the DTE of the hybrid electric vehicle according to claim 1, wherein in the deciding of whether or not the mode of the hybrid electric vehicle is changed from the HEV mode into the EV mode depending on the warning against the gasoline fuel exhaustion, the hybrid electric vehicle is maintained in the HEV mode when an electricity amount for changing the mode of the hybrid electric vehicle into the EV mode is smaller than a preset electricity amount.

5. The method for improving the DTE of the hybrid electric vehicle according to claim 1, wherein the DTE is displayed on a cluster of the hybrid electric vehicle, and is measured through comparison with the gasoline fuel and the electricity amount.

* * * * *

UNITED STATES PATENT AND TRADEMARK OFFICE
CERTIFICATE OF CORRECTION

PATENT NO. : 9,731,707 B2  
APPLICATION NO. : 14/956537  
DATED : August 15, 2017  
INVENTOR(S) : Kang Ho Lee Page 1 of 1

It is certified that error appears in the above-identified patent and that said Letters Patent is hereby corrected as shown below:

On the Title Page

Left column, item (73), immediately after "Hyundai Motor Company, Seoul (KR)" insert --; Kia Motors Corporation, Seoul (KR)--.

Signed and Sealed this  
Twenty-seventh Day of November, 2018

Andrei Iancu  
*Director of the United States Patent and Trademark Office*